March 17, 1959 W. P. POWERS 2,877,962
SELF-CENTERING COILED STOCK REEL
Filed Feb. 18, 1957 3 Sheets-Sheet 1
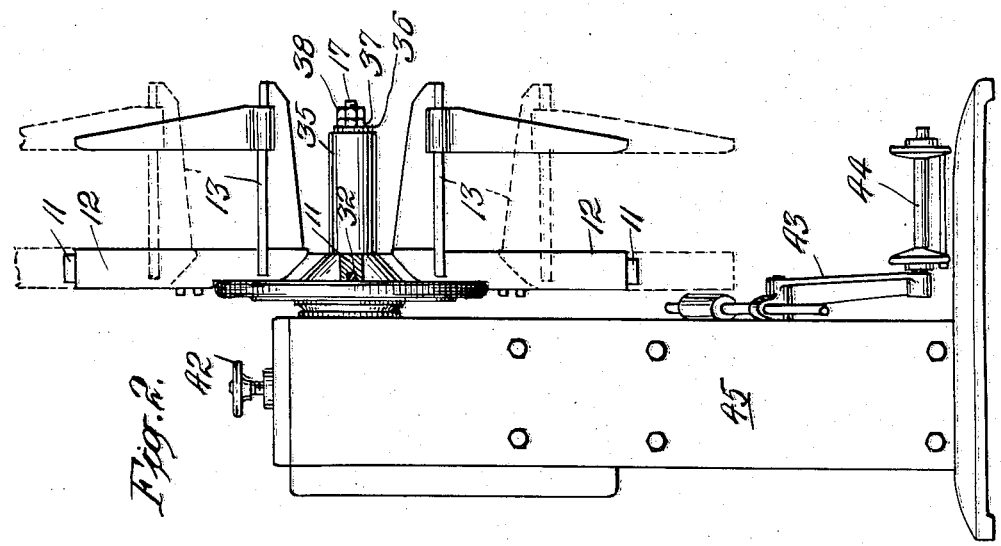
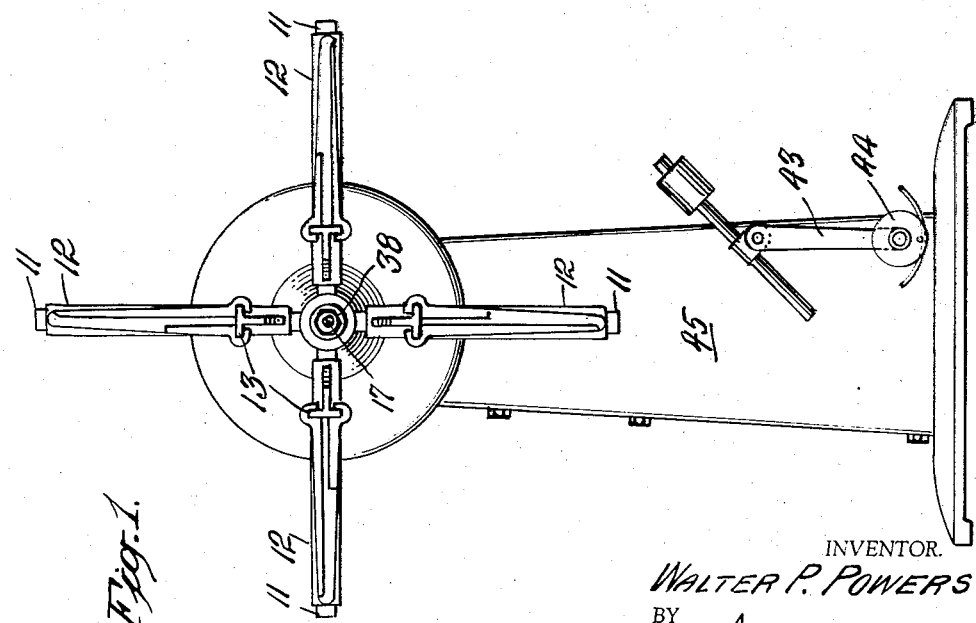
INVENTOR.
WALTER P. POWERS
BY
ATTORNEY

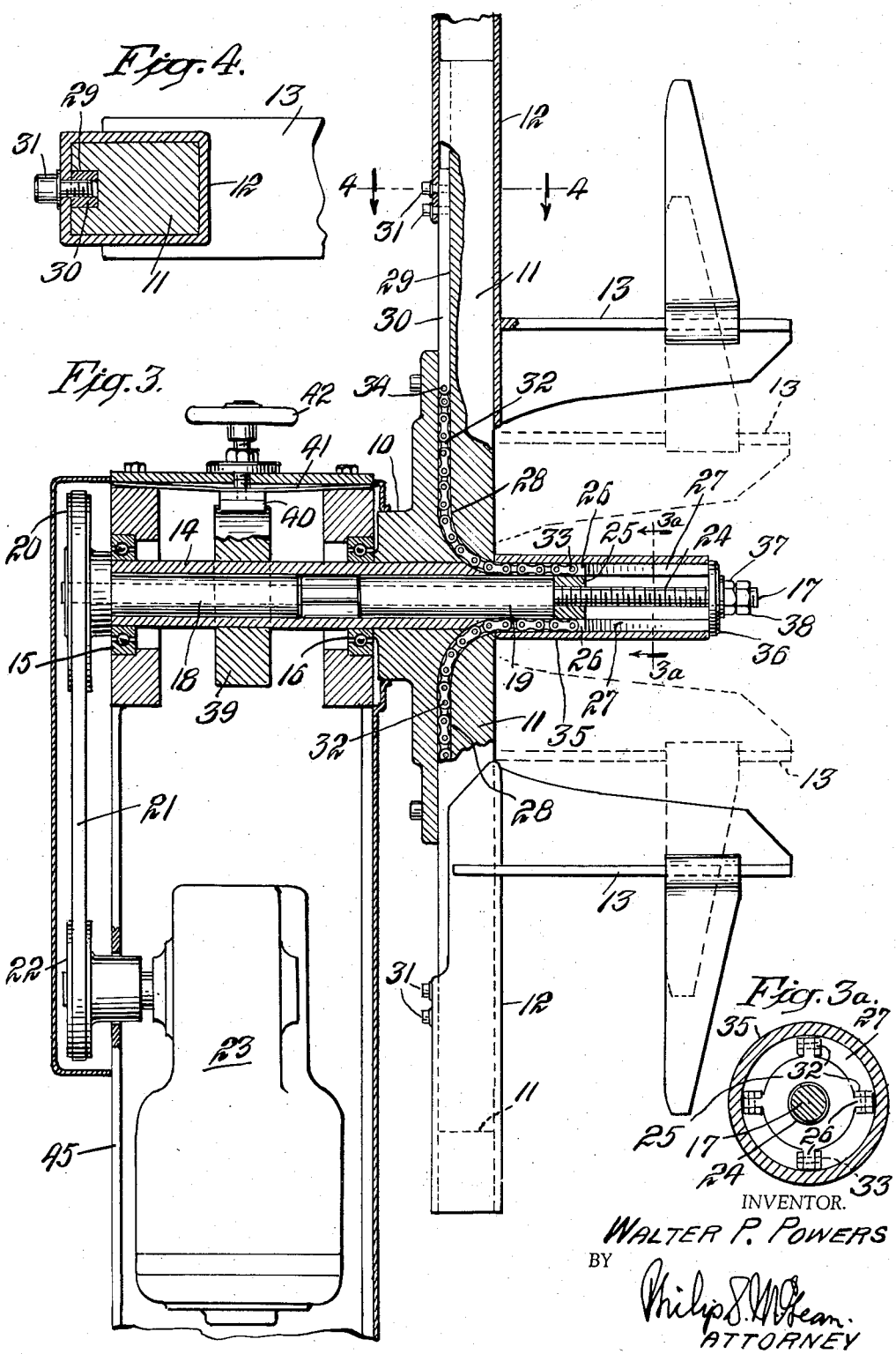

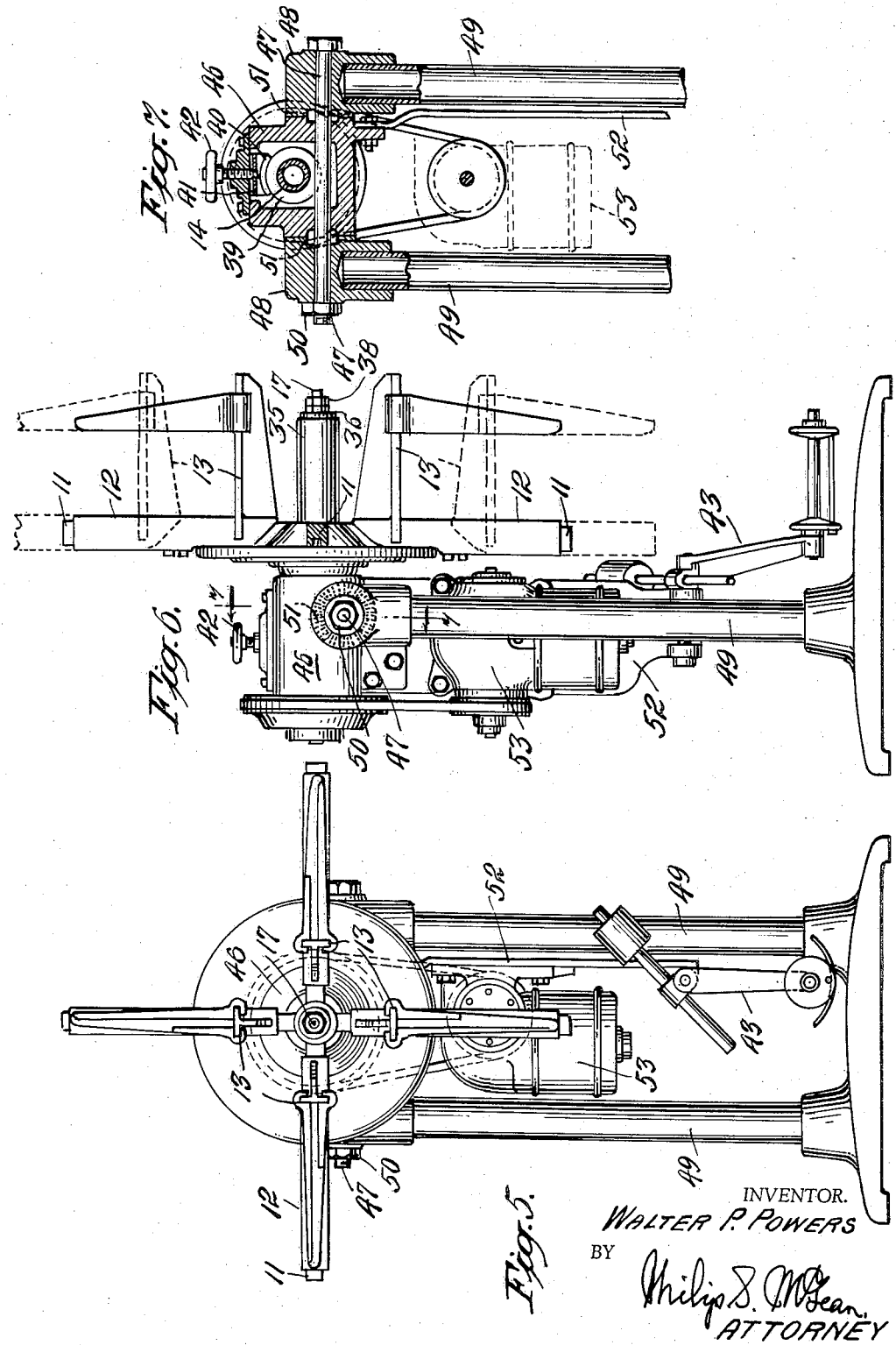

United States Patent Office 2,877,962
Patented Mar. 17, 1959

2,877,962

SELF-CENTERING COILED STOCK REEL

Walter P. Powers, Spring Lake, N. J., assignor to C. Todd, Rutherford, N. J., as trustee Application February 18, 1957, Serial No. 640,729

5 Claims. (Cl. 242—110.2)

The invention herein disclosed relates to reels for handling coiled stock.

Objects of the invention are to provide a self-centering form of reel, of simple sturdy construction, which can be easily loaded and unloaded and which in its use and normal operation will automatically center and hold the stock firmly gripped and properly centered.

These and other desirable objects are attained by certain novel features of construction and combination involving in part a rotary hub having radially extending spoke-like arms carrying radially shiftable coil supports and a central drive shaft within the hub, rotatable conjointly with and independently of the hub, said drive shaft having a screw-threaded portion carrying a travelling nut connected by chains or other suitable means with the coil supports so that upon relative rotation, such as might result when the hub is stationary and power is applied to the drive shaft, the nut will be caused to travel in the direction to spread the coil supports and thus cause them to grip and center the stock before or while imparting rotation to the hub.

Other objects attained by the invention and further novel features are set forth or will appear in the course of the following specification.

The drawings accompanying and forming part of the specification illustrate certain presently preferred embodiments of the invention. Structure however, may be modified and changed as regards such illustration, all within the true intent and scope of the invention as hereinafter defined and claimed.

Fig. 1 in the drawings is a front elevation of a cabinet type form of the reel.

Fig. 2 is a side elevation of the same.

Fig. 3 is an enlarged broken and part vertical sectional view through the central portion of the reel. Fig. 3a is an enlarged cross-sectional view on line 33 of Fig. 3.

Fig. 4 is a further enlarged broken cross-sectional view of one of the sliding coil carriers on substantially the plane of line 4—4 of Fig. 3.

Fig. 5 is a front elevation of a tilting form of the reel.

Fig. 6 is a side elevation of the latter, with one of the radial supports shown in section.

Fig. 7 is a broken and part vertical sectional view on substantially the plane of line 7—7 of Fig. 6.

Figs. 1, 2 and 3 show the reel as made up of a hub 10, having radial arms 11, on which are slidingly mounted the sleeves 12, carrying the outstanding supports 13, for the coil.

This spider construction is carried by a tubular supporting shaft 14, mounted in bearings 15, 16, Fig. 3.

A center drive shaft 17, is mounted free to rotate within the tubular carrying shaft, it being shown carried by spaced bearing bushings 18, 19, rotatable within the tubular shaft.

The central drive shaft is shown as having a pulley 20, on the outer end connected by belt 21, with pulley 22, on the motor drive unit 23.

At the opposite end, the drive shaft has an elongated coarse screw thread portion 24, and on this there is mounted a travelling nut block 25, having radially projecting lugs 26, slidingly engaged in confining guide slots 27, in the tubular carrier shaft.

The guide slots 27, are aligned with the radial arms of the spider and from the inner ends of these slots passages 28, of substantially the same cross-section extend on a gradual curve radially outwardly of the supporting arms 11.

The outer radially extending portions of these passages are shown extended in the backs of the supporting arms as open radially extending grooves 29, in which slidingly operate bars 30, of corresponding cross-section connected at their outer ends with the carrier sleeves by bolts or other suitable fastenings 31.

Flexible connections extend from the travelling nut to the slide bars 30. Sprocket chains of a size to slidingly fit in the slots 27, and passages 28, have been found well suited to this purpose. These chains are designated 32, and are shown pinned at 33, in slotted portions of the radial lugs 26, at the nut end and pinned at 34, at the opposite ends to the slide bars 30.

A cover sleeve 35, is shown engaged over the slotted end portion of the tubular shaft, enclosing the nut and those portions of the chains lying in these slots.

A cap 36, is shown closing the ends of the tubular shaft and cover sleeve secured in rotative relation therewith, on the center shaft by adjusting nut 37, and lock nut or jam nut 38.

To assure action of the screw sufficient to set the coil supports in firm centering engagement with the stock at the start of winding or unwinding operations, the outer, supporting shaft may be braked, as by means of a brake disc 39, Fig. 3, engaged by a brake pad 40, supported by spring 41, and adjusted by hand screw 42.

From the description thus far, it will be apparent that with the brake set at 42, to momentarily hold the tubular supporting shaft 14, when the power is turned on, the central drive shaft will be rotated within the then stationary outer shaft, causing the screw 24, to advance the nut block 25, and through chains 32, connected therewith to extend the coil supports and after taking up any slack that may be present, imparting rotation to the spider as a whole. In this centered and firmly gripped relation, the lugs 26, on the nut block serve as keys in engagement in slots 27, to drive the carrier shaft.

Starting and stopping of the drive motor may be automatically controlled as by the switch controlling pivoted slack loop arm 43, carrying roller 44, engageable with the loop of stock passing to or from the reel.

In the cabinet type of reel shown in Figs. 1, 2 and 3, the various parts described are supported and to a desired extent enclosed within an upstanding cabinet structure 45.

In the tilting or angularly adjustable form of the invention shown in Figs. 6 and 7, the entire operating structure is carried by a base 46, pivoted to rock on a through bolt 47, between opposing clamp heads 48, on the upper ends of the posts or stanchions 49, and which can be set up in fixed holding engagement with such base by nut 50, on the end of the supporting bolt.

The opposing faces of the base and the clamp members 48, may be radially toothed as indicated at 51, Figs. 6 and 7, to insure positive holding in various positions of angular adjustment.

In this construction, the pivotally supported base 46, is extended downwardly as by means of a dependent plate or bar 52, to carry the drive motor 53, and the loop control 43.

This construction enables the reel to be quickly adjusted to various positions out of the vertical and to be then secured in fixed relation by simply loosening and then tightening the one clamp nut 50, Fig. 7. In all such positions of adjustment, the drive motor and control mechanism will be shifted with the reel, enabling all this to be accomplished with the single adjustment means.

The structure in all cases is particularly simple and the self-centering operation is automatic, coming into action each time the reel is started. The working parts are enclosed and protected and can be readily kept properly lubricated. The relatively simple design and few parts provide a structure that can be produced at low cost and one which will continue in serviceable condition without special care or attention.

The inertia of the spider carrying the coil may be enough to cause the relative rotative movement necessary to center and grip the coil stock so as to require little or possibly no braking or holding of the outer shaft. And for long extended reeling operations, the brake may be backed off or fully released by simply turning the hand wheel 42.

The motor unit may be reversible so that by reversing the same the coil supports can be quickly retracted to facilitate loading and unloading of the machine.

The sprocket or link chains of substantially square cross-section, slidingly guided in the passages provided therefor constitute non-rotatable substantially inextensible and incompressible constant length push-pull connecting means assuring uniform and accurate shifting and positioning of the coil supports.

What is claimed is:

1. Automatic self-centering reel, comprising concentrically journaled independently rotatable drive and driven shafts, coil supports carried by and radially adjustable in respect to said driven shaft, power means for operating said drive shaft in reverse directions, a screw drive connection from said drive shaft to said driven shaft, including companion nut and screw elements, one element in fixed relation to said drive shaft and the other element slideably keyed in longitudinally shiftable relation to said driven shaft so as to be shifted longitudinally of said driven shaft upon relative motion of said drive shaft in respect to the driven shaft and operating connections extending from said longitudinally shiftable element to said radially adjustable coil supports for translating movements of said longitudinally shiftable screw element into radial movements of said coil supports and whereby said drive shaft may be power operated in opposite directions to effect expansive and contractive movements of said coil supports and drive of said coil support carrying shaft from said power operated shaft through said connections for effecting radial adjustment of the coil supports.

2. The invention according to claim 1, with a brake for holding said driven shaft while said drive shaft is being power operated to effect expansive or contractive adjustment of the coil supports.

3. The invention according to claim 1, in which the screw element is fixed to the drive shaft, the driven shaft has a keyway slot and the nut element has a key slidingly engaged in said slot.

4. The invention according to claim 1, in which the screw element is a screw threaded portion of the drive shaft, the driven shaft has keyway slots, the nut element is engaged on said screw threaded portion of the drive shaft and has key lugs slidingly engaged in said slots and said operating connections are in the form of flexible chains connected with said key lugs and extending outwardly through radial guides to said coil supports.

5. The invention according to claim 1, in which said driven shaft is longitudinally slotted, the shiftable screw element has a key slidingly guided in the slotted portion of the driven shaft and the slotted portion of said shaft is covered by a surrounding sleeve.

References Cited in the file of this patent

UNITED STATES PATENTS

| | | |
|---|---|---|
| 502,373 | Munslow | Aug. 1, 1893 |
| 2,017,300 | Wiesman | Oct. 15, 1935 |
| 2,270,064 | Littell | Jan. 13, 1942 |